INVENTOR.
RAYMOND A. MC CREARY

BY

ATTORNEYS

United States Patent Office 3,295,808
Patented Jan. 3, 1967

3,295,808
PARALLEL MOTION SUSPENSION DEVICE
James E. Webb, Administrator of the National Aeronautics and Space Administration with respect to an invention of Raymond A. McCreary
Filed Apr. 16, 1965, Ser. No. 448,898
6 Claims. (Cl. 248—178)

The invention described herein was made in the performance of work under a NASA contract and is subject to the provisions of section 305 of the National Aeronautics and Space Act of 1958, Public Law 85-568 (72 Stat. 435; 42 U.S.C. 2457).

This invention relates to parallel motion suspension devices, more particularly to movable suspension devices for measuring instruments, tools, optical devices and the like which require highly accurate movement along a precise axis for a short distance.

The prior art in the class to which this invention belongs shows the application of parallel E springs between which a load is mounted. Although the movement of the load is parallel to the base, the travel of the load is arcuate. The present invention allows perfect linear travel of the load while maintaining parallel orientation. Various elastic suspension devices show the load suspended between leaf springs. These leaf springs are in a cascaded configuration in line along the axis of the load. The possibility of transverse movement or error is obviated in the present invention by using a symmetrical arrangement of leaf springs in both an axial and a transverse plane as opposed to symmetry in an axial plane only. Other patents in the art deal with leaf-spring suspensions usable in angular motions whereas the present invention is a linear motion device only. The prior art therefore does not fulfill the requirements or objects of this invention.

Included in the objects of this invention are:

First, to provide a parallel motion suspension device which, within the range of movement intended for devices of this class, provides extremely accurate movement along a selected axis.

Second, to provide a parallel motion suspension device which is symmetrical about two perpendicular axes and so that the forces are balanced and essentially friction free.

Third, to provide a parallel motion suspension device which may be constructed so as to be particularly rugged to withstand forces in directions other than the intended axis of travel of its moving element without causing deflections.

With the above and other objects in view as may appear hereinafter, reference is directed to the accompanying drawings, in which.

Figure 1:
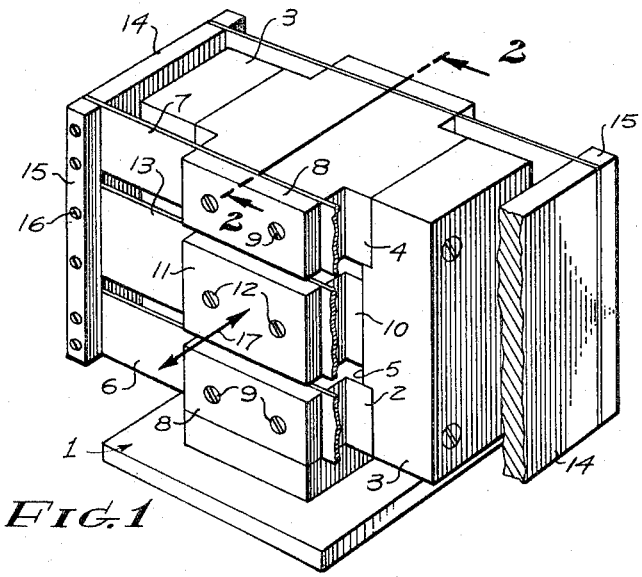
FIGURE 1 is a perspective view of the parallel motion suspension device in its normal or unflexed condition with portions broken away to show the internal construction.
Figure 2:
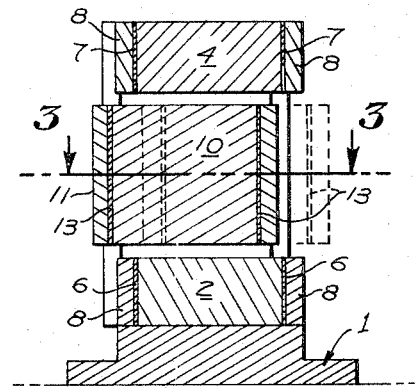
FIGURE 2 is a reduced longitudinal section view taken substantially through 2—2 of FIG. 1, showing the movable element in an extended position.
Figure 4:
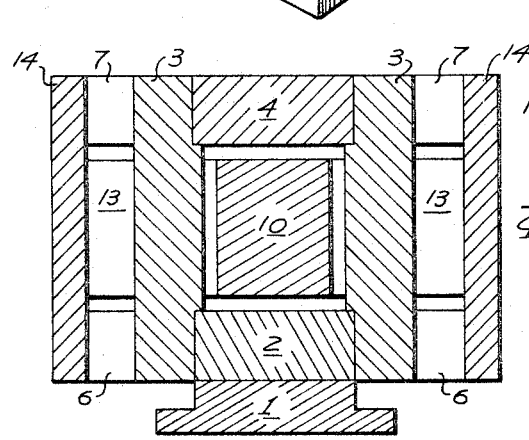
FIGURE 4 is a sectional view taken through 4—4 of FIG. 3.
Figure 3:
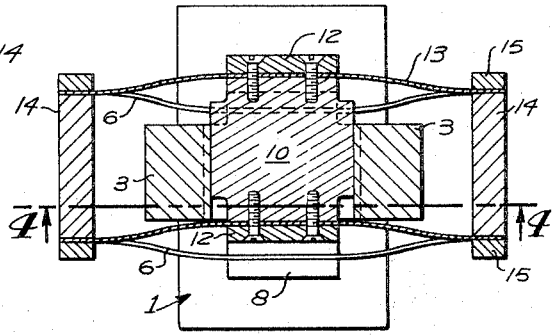
FIGURE 3 is a sectional view taken through 3—3 of FIG. 2.

The parallel motion suspension device is mounted on a base 1. Secured to the base is a lower, fixed mounting block 2 which is essentially cross-shaped. Joined to two opposite sides of the block 2 is a pair of upwardly extending connecting bars 3. The upper extremities of the bars 3 are joined to an upper fixed mounting block 4 which is identical to the block 2. The two fixed blocks and connecting bars form a frame having a substantial axial dimension defining a rectangular opening 5.

The axial extremities of the fixed blocks project beyond the bars 3 and their common ends are coplanar and perpendicular to the base 1. Secured to the extremities of the lower block 2 at their mid-portions is a pair of lower leaf or flexure springs 6. Similarly, the upper block 4 is provided with a pair of leaf or flexure springs 7. The central portions of the springs are covered by retainer plates 8, which are coextensive with the ends of the blocks, and secured by screws 9.

The opening 5 receives a movable block 10 equal in length to the fixed blocks. Secured to the ends of the movable block by retainer plates 11 and screws 12 is an intermediate pair of leaf or flexure springs 13. The springs at common ends of the blocks 2, 4, and 10 form a set occupying a common plane. All of the springs are equal in length and project laterally beyond the connecting bars 3.

Each of the extremities of the two sets of springs which extend in a common direction are joined by a rectangular connecting plate 14. The two plates are equal in width to the common length of the blocks 2, 4, and 10. The extremities of the springs are covered by retainer bars 15 and secured by screws 16.

The intermediate springs 13 are twice the width of the springs 6 and 7, but otherwise the springs are identical. Consequently, the force required to flex the springs 13 a given amount is equal to the force required to flex the springs 6 and 7 an equal amount.

By reason of the suspension of the movable block 10 by the springs 6 and 7, connecting plates 14 and springs 13, the movable block is constrained to a movement precisely along its axis as represented by the arrow 17 shown in FIG. 1, even though side forces may occur. One or more of the suspension devices may be employed, depending upon the instrument, tool, or apparatus to be attached to the movable block or blocks.

Figure 5:
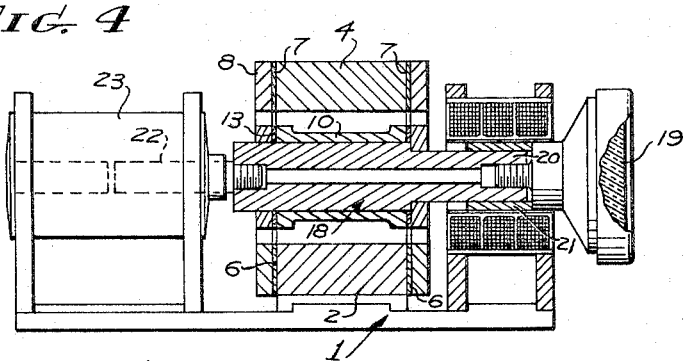
FIGURE 5 is a sectional view similar to FIGURE 2, showing an adaption of the parallel motion suspension device employed to support and move an interferometer mirror.

One application of the suspension device is illustrated in FIG. 5 wherein the device is utilized to suspend an interferometer mirror. In this construction, the movable block 10 is provided with a bore which receives a spindle 18 having a mirror 19 secured to one end. Between the mirror and movable block the spindle is provided with an armature sleeve 20 surrounded by a transducer core 21. Extending from the opposite end of the spindle is an armature rod 22 surrounded by a driving coil 23.

The transducer senses the position of the spindle 18 and controls the driving coil by means of a conventional control circuit, not shown.

While there has been described what is at present considered a preferred embodiment of the present invention, it will be apparent to those skilled in the art that various modifications and changes may be made without departing from the essence of the invention, and it is intended to cover herein all such modifications and changes as come within the true scope and spirit of the appended claims.

What is claimed is:
1. A parallel motion suspension means, comprising:
   (a) a fixed frame having axially spaced ends and an opening extending therebetween;
   (b) a first and a second pair of leaf springs secured intermediate their extremities to the ends of said frame at opposite sides of said opening;
   (c) a movable element positioned in said opening;
   (d) a third pair of leaf springs secured intermediate their extremities to the ends of said movable element, the members of said third pair of leaf springs being disposed between the members of said first and second pair of leaf springs, and the leaf springs at one end of said fixed frame and movable element normally occupying common planes;

(e) and a pair of connecting plates secured to the extremities of said leaf springs to support said movable element free of the walls of said opening and limit said movable member to axial travel.

2. A parallel motion suspension means, comprising:
(a) a fixed frame having axially spaced ends and an opening extending therebetween;
(b) a movable element having axially spaced ends and received in said opening;
(c) leaf springs secured to each end of said movable element and each end of said fixed frame to form axially spaced laterally directed sets of spring elements;
(d) and a pair of connecting members spaced from the opposite lateral sides of said fixed frame and joining the sets of spring elements thereby to suport said movable element in spaced relation to the walls of said opening and limit said movable element to axial travel.

3. A parallel motion suspension device, comprising:
(a) a fixed frame having a central opening and axially spaced ends;
(b) a movable block received in said opening and also having axially spaced ends;
(c) a set of three laterally directed flexure springs at each end of said fixed frame and movable block, one member of each set secured intermediate its ends to said movable block and the other members of each set disposed in flanking relation thereto;
(d) and a laterally spaced pair of connecting members interconnecting said sets of springs at their extremities, thereby to suspend said movable block in said opening and limit said movable block to axial travel on flexure of said springs.

4. A parallel suspension device, comprising:
(a) a fixed lower block;
(b) a fixed upper block;
(c) a pair of connecting bars securing said fixed blocks in spaced relation;
(d) a movable block disposed between said fixed blocks;
(e) flexure springs extending laterally from the ends of each block;
(f) and a pair of laterally disposed connecting members joining the extremities of said springs to suspend said movable block between said fixed block for axial travel by flexure of said springs.

5. A parallel suspension device, comprising:
(a) a fixed lower block;
(b) a fixed upper block;
(c) a pair of connecting bars securing said fixed blocks in spaced relation;
(d) flexure spring members extending in opposite lateral directions from each end of each fixed block;
(e) flexure spring elements disposed between said flexure spring members at each end of said blocks;
(f) a pair of connecting members joining the extremities of the flexure spring members and elements extending in a common direction;
(g) and a movable block disposed between said fixed blocks and joined to said flexure spring elements for suspension thereby, said spring members and spring elements constraining said movable block to axial travel.

6. A parallel suspension device, comprising:
(a) a fixed lower block;
(b) a fixed upper block;
(c) a pair of connecting bars securing said fixed blocks in spaced relation;
(d) a movable block disposed between said fixed blocks;
(e) sets of leaf springs secured to the ends of said blocks and extending laterally in opposite directions therefrom;
(f) and a connecting member spaced laterally from said blocks and joined to the extremities of both sets of springs which extend in a common direction;
(g) each set of leaf springs normally defining a common plane perpendicular to the axes of said blocks, and on flexing, constraining movement of said movable block to travel precisely along its axis.

References Cited by the Examiner

UNITED STATES PATENTS

| | | | |
|---|---|---|---|
| 2,702,186 | 2/1955 | Head et al. | 73—517 |
| 2,753,176 | 7/1956 | List | 267—1 |
| 2,901,703 | 8/1959 | Plunkett | 324—155 |
| 2,907,563 | 10/1959 | Verde et al. | 267—1 |
| 2,932,482 | 4/1960 | Dickie | 248—358 |
| 2,976,734 | 3/1961 | Gindes et al. | 73—514 |
| 2,989,298 | 6/1961 | Ljungstrom | 267—1 |
| 3,038,331 | 6/1962 | Henry et al. | 73—116 |
| 3,045,535 | 7/1962 | Jacquinot et al. | 88—14 |
| 3,089,342 | 3/1963 | Willis | 73—514 |

CLAUDE A. LE ROY, *Primary Examiner.*

J. F. FOSS, *Assistant Examiner.*